(12) United States Patent
Murakami et al.

(10) Patent No.: US 7,347,100 B2
(45) Date of Patent: Mar. 25, 2008

(54) FORCE DETECTION DEVICE

(75) Inventors: Seiji Murakami, Osaka (JP); Naoto Tojo, Ikoma (JP)

(73) Assignee: Sanyo Electric Co., Ltd., Osaka (JP)

( * ) Notice: Subject to any disclaimer, the term of this patent is extended or adjusted under 35 U.S.C. 154(b) by 111 days.

(21) Appl. No.: 11/435,806

(22) Filed: May 18, 2006

(65) Prior Publication Data

US 2006/0272406 A1  Dec. 7, 2006

(30) Foreign Application Priority Data

May 19, 2005  (JP) ............................. 2005-146886

(51) Int. Cl.
  *G01N 3/08*  (2006.01)
(52) U.S. Cl. ........................................... 73/760; 414/4
(58) Field of Classification Search .......... 73/760–856; 414/4

See application file for complete search history.

(56) References Cited

U.S. PATENT DOCUMENTS

| | | | | |
|---|---|---|---|---|
| 3,713,501 A | * | 1/1973 | Hurt | ........................... 180/9.22 |
| 3,901,396 A | * | 8/1975 | Rhodes | ......................... 414/812 |
| 3,907,138 A | * | 9/1975 | Rhodes | ......................... 414/448 |
| 4,752,173 A | * | 6/1988 | Fleming | ....................... 414/10 |
| 2006/0243058 A1 | * | 11/2006 | Murakami et al. | ............ 73/818 |

FOREIGN PATENT DOCUMENTS

| | | |
|---|---|---|
| JP | 6-304204 | 11/1994 |
| JP | 3170438 | 3/2001 |

\* cited by examiner

*Primary Examiner*—Edward Lefkowitz
*Assistant Examiner*—Freddie Kirkland, III
(74) *Attorney, Agent, or Firm*—Westerman, Hattori, Daniels & Adrian, LLP.

(57) ABSTRACT

A force detection device of the present invention includes a handle to be given an operation force by an operator, disposed on a support reciprocatably in a first axis direction along a forward/backward direction of the truck and a second axis direction orthogonal thereto. A pair of force detection parts capable of detecting only a force in the first axis direction is disposed on the support in a spaced-apart relationship in the second axis direction. A force propagation body intervenes between both force detection parts and the handle. A part of the force propagation body passes through the inside of a gripped part of the handle. The force propagation body is coupled to the handle by a coupling axis extending in a third axis direction orthogonal to the first axis and second axis so as to be capable of relative rotation about the coupling axis.

8 Claims, 11 Drawing Sheets

FORCE DETECTION DEVICE

The priority application Number 2005-146886 upon which this patent application is based is hereby incorporated by reference.

BACKGROUND OF THE INVENTION

1. Field of the Invention

The present invention relates to a force detection device used in a power-assisted truck or the like in which human power is assisted with motive power.

2. Description of Related Art

There has been conventionally proposed a truck having a power assist function for assisting human power with motive power. FIG. 18 shows a handle 7 of a conventional power-assisted truck. A pair of splicing fittings 73, 73 each having a load cell 71 attached thereto are removably provided at both ends of a hand push handle 74. Both splicing fittings 73, 73 are fitted to both ends of a U-shaped bar handle 72. When an operator applies a force to the bar handle 72, which is detected by two load cells 71, 71, torque to be given to a motor (not shown) is controlled based on a detection result of both load cells 71, 71 to realize a power assist function (see JP 6-304204 A).

When the bar handle 72 is given a force in a forward/backward direction of the truck, this force can be detected by two load cells 71, 71. However, when the bar handle 72 is given a force in a lateral direction orthogonal to the forward/backward direction, this force cannot be detected by two load cells 71, 71 because two load cells 71, 71 are fitted to both ends of the U-shaped bar handle 72. The above conventional handle 7 has been having this problem.

A force detection device as shown in FIG. 19(a) has been proposed in order to solve this problem (see JP 3170438 B). A handle 81 is C-shaped. Both ends of the handle 81 are coupled to a truck body 84 via a pair of plate springs 82, 82. Facing each plate spring 82, a sensor 83 for detecting displacement of the plate spring 82 is provided at the truck body 84 side.

As shown in FIG. 19(a), when a force F1 in the backward direction of the truck body 84 is applied to the middle of the handle 81, a force in the pulling direction is applied to two plate springs 82, 82 to thereby flex two plate springs 82, 82 in the same direction.

On the other hand, as shown in FIG. 19(b), when a leftward force F2 as illustrated is applied to the middle of the handle 81, torque acts on the handle 81 to turn the handle 81, so that of two plate springs 82, 82, the left plate spring 82 is given a force in the pushing direction, while the right plate spring 82 is given a force in the pulling direction. This causes two plate springs 82, 82 to flex in opposite directions.

According to the above force detection device, because the handle 81 is coupled to the truck body 84 via the pair of plate springs 82, 82, not only a force in a forward/backward direction of the truck body 84 applied to the handle 81, but also a clockwise/counterclockwise turning force can be detected based on displacement of two plate springs 82, 82 detected by the pair of sensors 83, 83, an elastic coefficient of both plate springs 82, 82, a shape of the handle 81 and the like.

However, according to the above force detection device, if an operator grips the handle 81 at a position laterally shifted from the middle thereof and applies the forward/backward force, a rotational force acts on the handle 81 to displace two plate springs 82, 82 in opposite directions. In this case, a clockwise/counterclockwise turning force is supposed to have been applied to the handle 81 because an external force applied to the handle 81 is detected based on displacement of two plate springs 82, 82. Consequently, there has been a problem of the truck body 84 turning either clockwise or counterclockwise against the operator's intention of moving the truck body 84 forward or backward.

As a method for solving this problem, a method is possible of using a known position sensor or the like to detect a position where the operator grips the handle 81, and detecting an external force applied to the handle 81 based on a detection result of the gripped position and displacement of two plate springs 82, 82 detected by the pair of sensors 83, 83. However, if the operator grips the handle 81 with both hands but applies a force with only one hand, it is impossible to determine with which hand the force is applied even if such a method is used. Even if a force point where the external force is applied could be accurately detected, it would be necessary to expand a detection range of both sensors 83, 83 in order to detect a force applied to both ends of the handle 81. This has been causing a problem of a poorer detection resolution for a force applied to the middle of the handle 81.

SUMMARY OF THE INVENTION

Accordingly, an object of the present invention is to provide a force detection device capable of accurately detecting a direction of a force applied to a handle regardless of a gripped position of the handle.

A force detection device 1 of the present invention is for detecting an operation force applied by an operator in a forward/backward direction and/or lateral direction of an object, and comprises a handle 6 to be gripped and given the operation force by the operator, disposed on a support 4 reciprocatably along a first axis direction along the forward/backward direction and a second axis direction orthogonal thereto, and unrotatably about a third axis direction orthogonal to the first axis and second axis; a pair of force detection parts 2, 2 capable of detecting only a force in the first axis direction, disposed on the support 4 in a spaced-apart relationship in the second axis direction; and a force propagation body 3 for transmitting an external force applied to the handle 6 to both force detection parts 2, 2, which intervenes between both force detection parts 2, 2 and the handle 6.

The force propagation body 3 includes a pair of pressing parts 31, 31 for pressing the pair of force detection parts 2, 2, protruded toward the force detection parts 2, 2. The pressing parts 31 are restricted from relative displacement to the support 4 in the second axis direction by their engagement with the respective force detection parts 2, and the force propagation body 3 is coupled to the handle 6 so as to be capable of relative rotation to the handle 6 about the third axis.

With the above force detection device of the present invention, if the operator grips the handle 6 at a position shifted from the middle thereof and applies a force in the first axis direction, the handle 6 is relatively displaced to the support 4 in the first axis direction without rotating because it is restricted so as to be unrotatable about the third axis. The force applied to the handle 6 always acts on a constant position of the force propagation body 3, i.e. coupled position with the handle 6, independently of the position where the operator has applied the force to the handle 6.

The force propagation body 3 is thereby relatively displaced to the support 4 with the handle 6 in the first axis direction to cause both pressing parts 31, 31 to press the force detection parts 2, 2. Consequently, a force in the same direction along the first axis direction is detected at both force detection parts 2, 2, based on which a movable body with the force detection device 1 is given a forward or backward drive force.

On the other hand, if the operator applies a force in the second axis direction to the handle 6, the handle 6 is relatively displaced to the support 4 in the second axis direction. Because both pressing parts 31, 31 are restricted from displacement in the second axis direction by their engagement with the force detection parts 2, 2, a rotational force about the third axis occurs at the force propagation body 3. This displaces one pressing part 31 closer to one force detection part 2, and displaces the other pressing part 31 farther from the other force detection part 2. Consequently, forces in different directions along the first axis direction act on both force detection parts 2, 2, based on which the movable body with the force detection device 1 is given a clockwise or counterclockwise turning drive force.

Therefore, according to the above force detection device 1 of the present invention, a magnitude and direction of a force applied to the handle 6 can be accurately detected regardless of a gripped position of the handle 6.

DETAILED DESCRIPTION OF THE INVENTION

Figure 1:
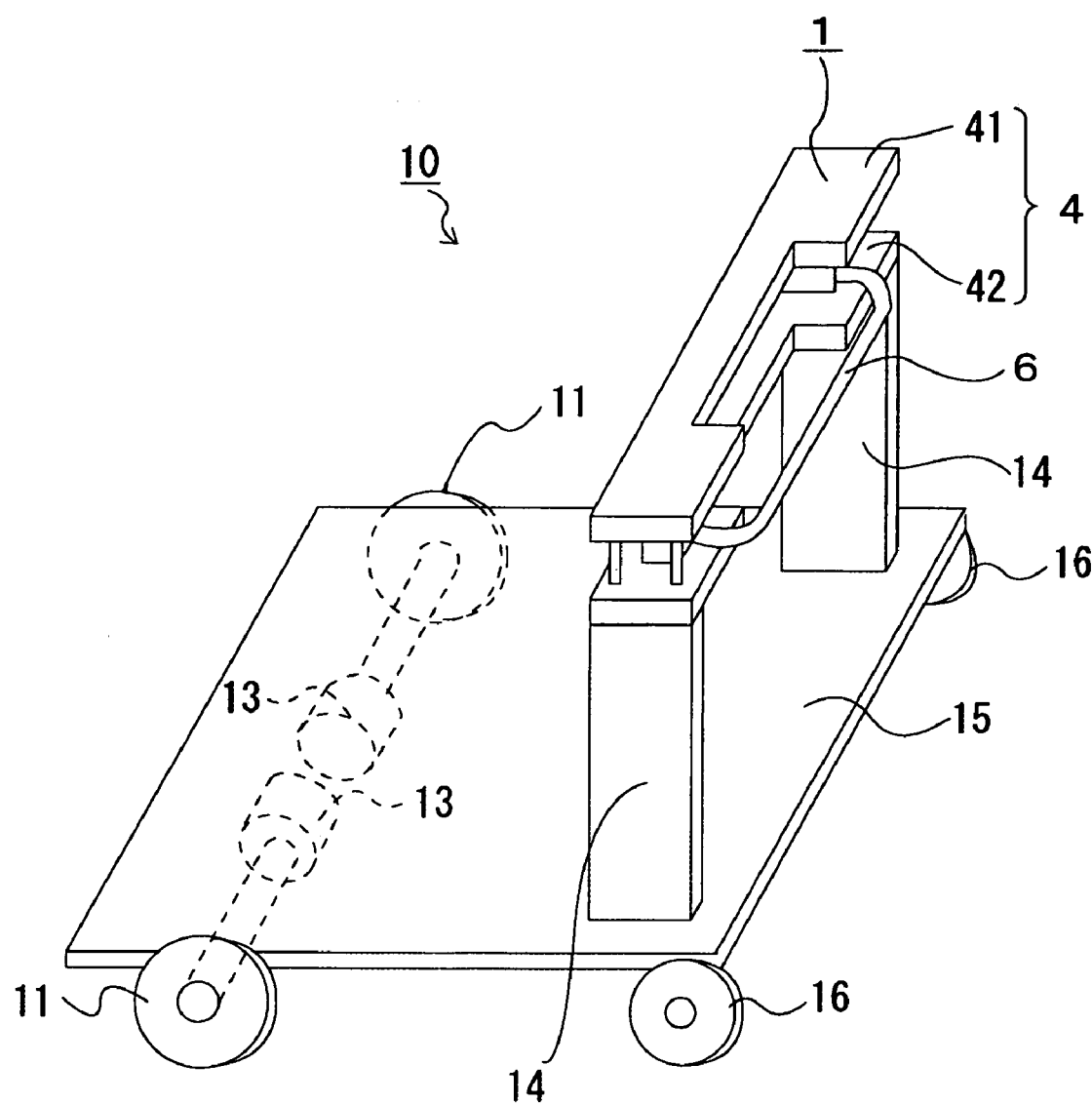
FIG. 1 is a perspective view showing a simplified appearance of a power-assisted truck embodying a force detection device of the present invention.

A force detection device of the present invention embodied in a power-assisted truck will be specifically described below with reference to the drawings. As shown in FIG. 1, a power-assisted truck 10 of the present invention includes a carrier 15. On a reverse surface of the carrier 15, a pair of drive wheels 11, 11 are disposed at the front thereof in a traveling direction of the truck 10, while a pair of auxiliary wheels 16, 16 are disposed at the rear of the truck 10. Motors 13, 13 for independently driving both drive wheels 11, 11 are connected to both drive wheels 11, 11.

A pair of support members 14, 14 are erected at a rear end of the carrier 15. A force detection device 1 is disposed on both support members 14, 14. The force detection device 1 is provided with a handle 6 to be gripped and given an operation force by an operator. When the operator applies a force to the handle 6, the force detection device 1 detects the forward/backward operation force and/or clockwise/counterclockwise turning operation force for the truck 10, and controls torque and steering directions of both motors 13, 13 based on the detection result to thereby realize a power assist function.

The forward/backward direction of the truck 10 is hereinafter referred to as a first axis direction, a lateral direction orthogonal to the first axis direction as a second axis direction, and a direction orthogonal to the first axis direction and second axis direction as a third axis direction.

Figure 2:
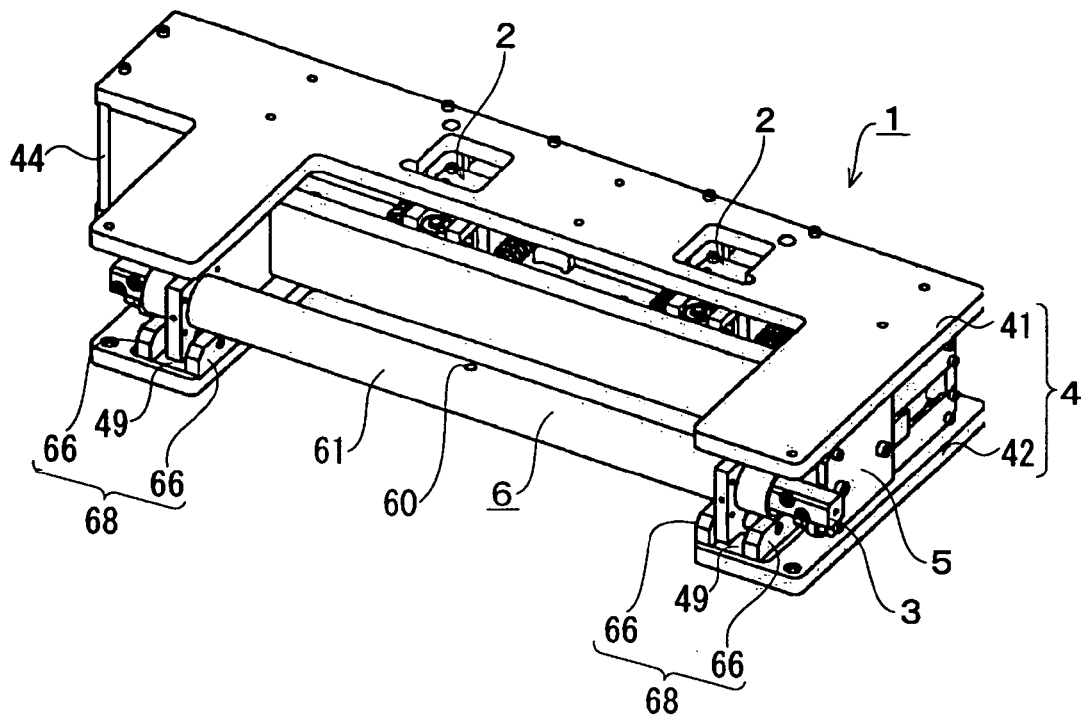
FIG. 2 is a perspective view showing an appearance of the force detection device of the present invention.
Figure 3:
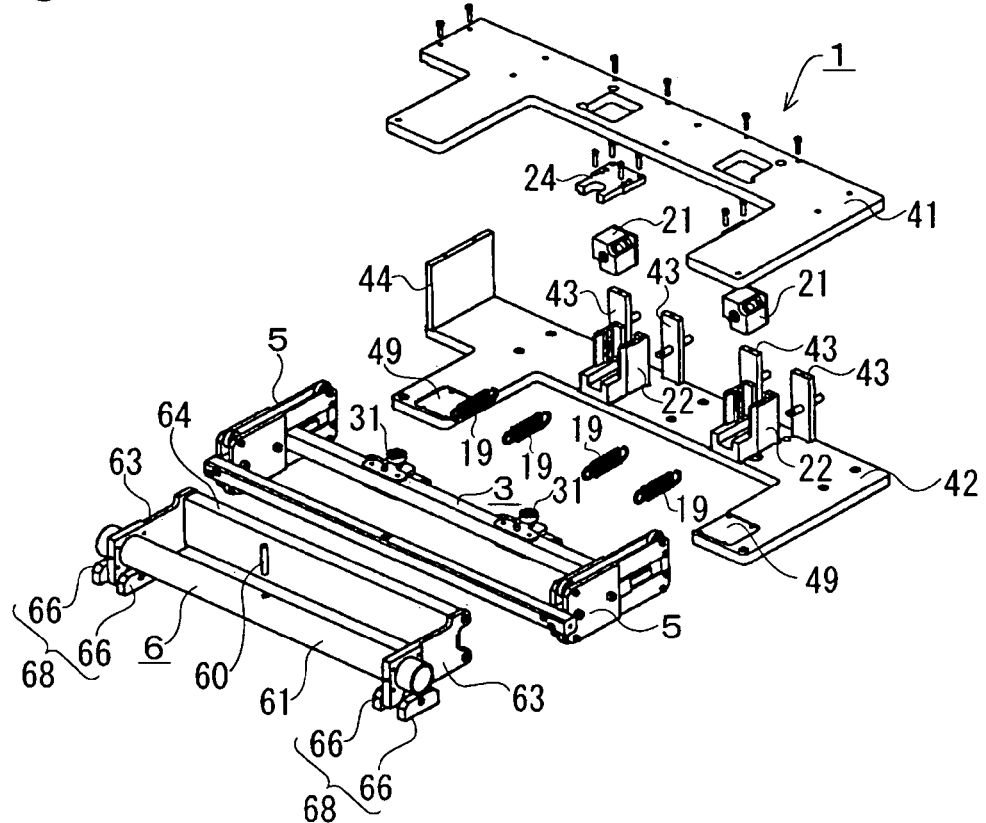
FIG. 3 is an exploded perspective view showing a configuration of the force detection device.

As shown in FIG. 2 and FIG. 3, the force detection device 1 of the present invention includes a support 4. The support 4 includes a top plate 41 and a base plate 42, which are both approximately U-shaped and coupled to each other by a side plate 44 and four quadrangular prism-like spring hook plates 43-43. A pair of force detection parts 2, 2 for detecting an external force applied to the handle 6 are provided side by side on a surface of the base plate 42.

The handle 6 including a rectangular frame body is disposed on the support 4 in the first axis direction. A force propagation body 3 for transmitting the external force applied to the handle 6 to both force detection parts 2, 2 intervenes between both force detection parts 2, 2 and the handle 6. The force propagation body 3 is coupled to the support 4 by four coil springs 19-19. The force propagation body 3 is provided with a pair of pressing parts 31, 31 opposed to both force detection parts 2, 2, and also provided with force propagation body support parts 5 at both sides thereof, which respectively slidingly contact with a reverse surface of the top plate 41 and a front surface of the base plate 42.

As shown in FIG. 3, each force detection part 2 includes a force sensor 21 contained inside the space surrounded by a rail member 22 erected on the base plate 42 and an upper plate 24 for covering an upper portion of the rail member 22.

Figure 4:
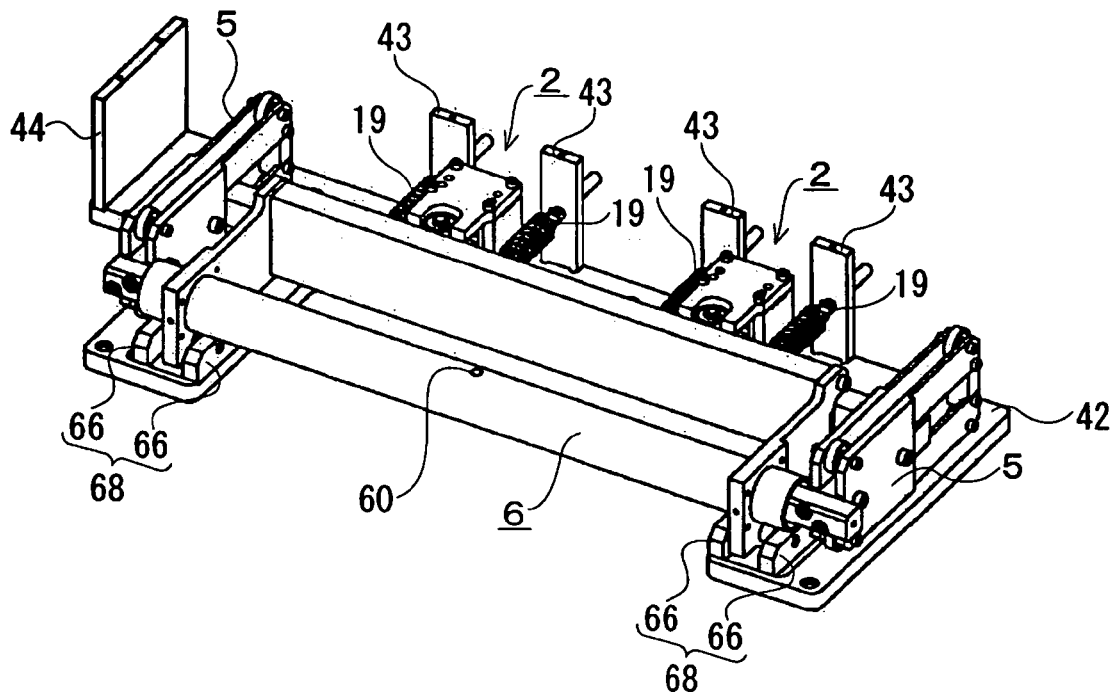
FIG. 4 is a perspective view showing the force detection device with a top plate removed therefrom.

FIG. 4 shows the force detection device 1 shown in FIG. 2 with the top plate 41 removed therefrom. As shown in FIG. 4, coil springs 19, 19 are disposed at both sides of each force detection part 2. Each coil spring 19 is stretched between a spring hook plate 43 erected on the base plate 42 and a pressing part 31 of the force propagation body 3. The force propagation body 3 is biased in such a direction as to be closer to the force detection parts 2 by elastic forces of four coil springs 19-19. The force sensors 21 of the force detection parts 2 are thereby given a certain preload.

Each part of the force detection device 1 will be described below in detail.

Handle

Figure 5:
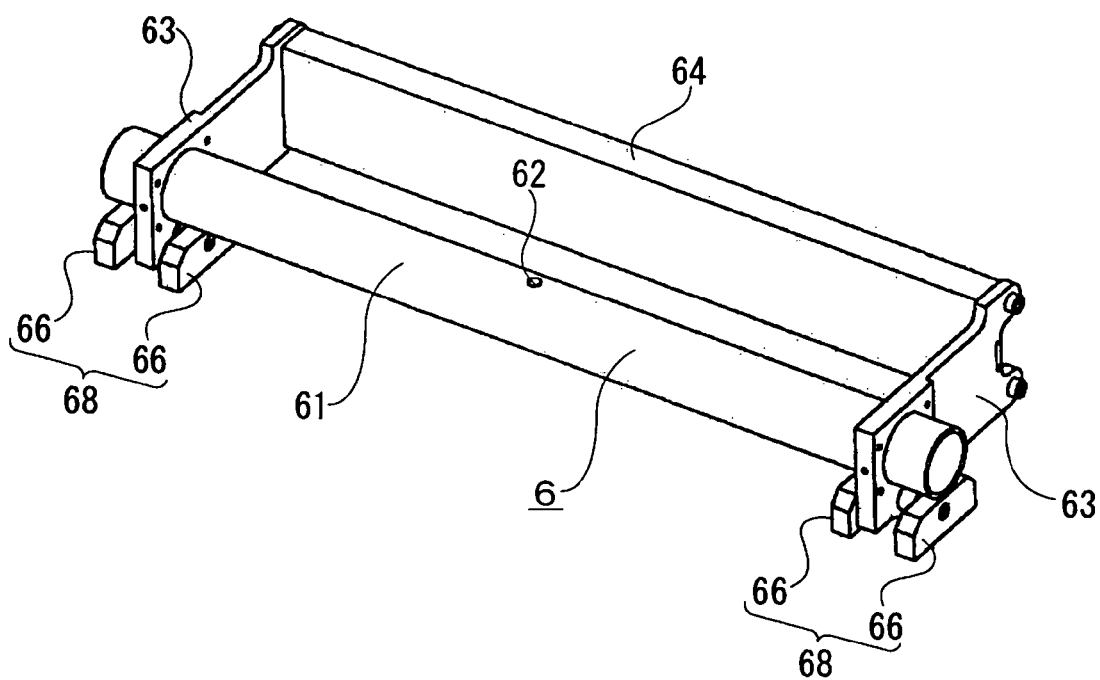
FIG. 5 is a perspective view showing a handle.

As shown in FIG. 5, the handle 6 includes a rectangular frame body including a cylindrical gripped part 61 to be gripped by an operator, a pair of side plates 63, 63 that both ends of the gripped part 61 penetrate, and a coupling part 64 coupling rear ends of both side plates 63, 63 together and extending parallel with the gripped part 61. A small hole 62 into which a coupling axis 60 described below is to be fitted is provided in the middle of the gripped part 61.

As shown in FIG. 2 and FIG. 3, the handle 6 is supported by a pair of support stands 68, 68. Both support stands 68, 68 are respectively fixed to a pair of recesses 49, 49 recessed in a surface of ends of the base plate 42 shown in FIG. 3.

Figure 9:
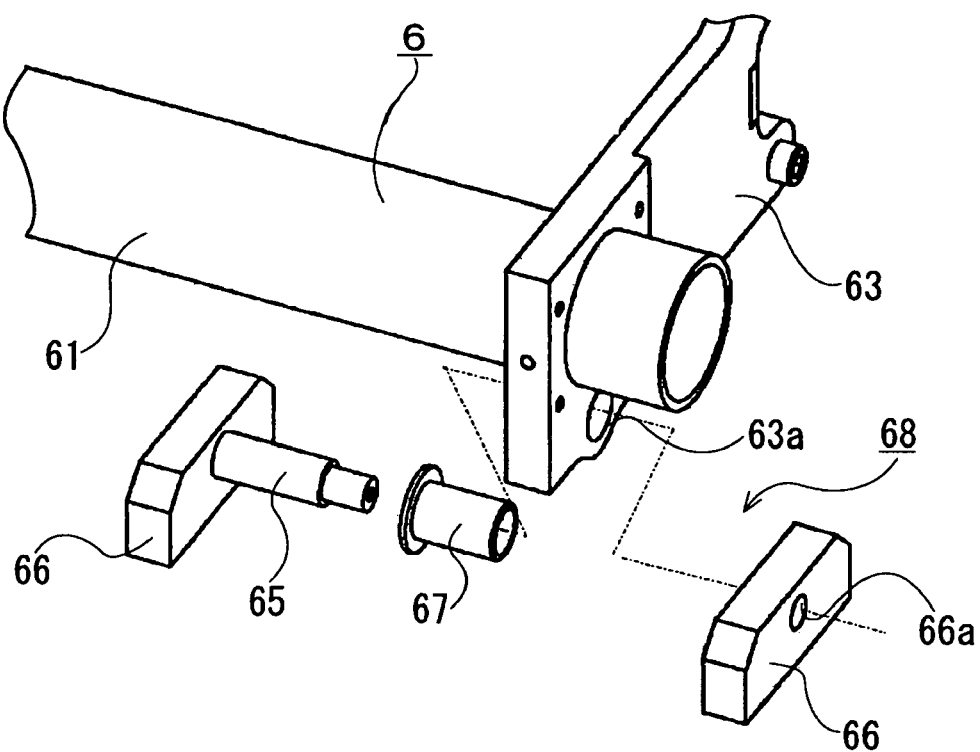
FIG. 9 is an exploded perspective view showing a coupling structure of the handle and a support stand.

As shown in FIG. 9, each support stand 68 is attached to a lower side of a front end of each side plate 63 of the handle 6. The support stand 68 includes a pair of support blocks 66, 66 disposed at both sides of the side plate 63 sandwiched therebetween. Of both support blocks 66, 66, one support block 66 positioned at the inner side of the side plate 63 is provided with a columnar shaft 65 protruded toward the other support block 66, and the other support block 66 is provided with a fitting hole 66a into which an end of the shaft 65 is to be fitted. A through hole 63a for passing the shaft 65 therethrough is provided in each side plate 63 of the handle 6 below a projecting position of an end of the gripped part 61.

Both support blocks 66, 66 are attached to the side plate 63 by fitting the shaft 65 of one support block 66 into the through hole 63a of the side plate 63 with the shaft 65 inserted into an approximately cylindrical resin bushing 67 having a collar, and fitting the end thereof into the fitting hole 66a of the other support block 66. This enables the handle 6 relative to the support 4 to swing in the first axis direction on the shaft 65 of the support stand 68, and to be relatively displaced in the second axis direction along the shaft 65 of the support stand 68.

Force Propagation Body

Figure 6:
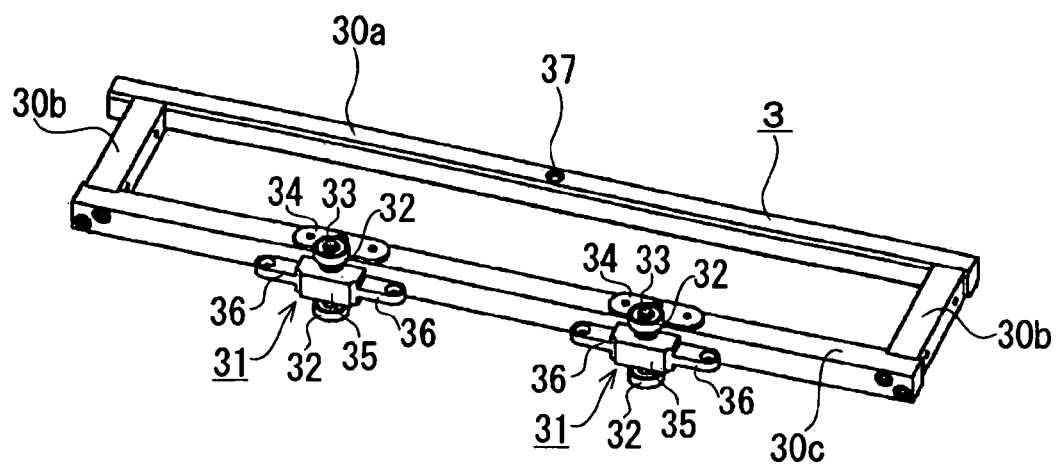
FIG. 6 is a perspective view showing an appearance of a force propagation body and pressing parts.
Figure 7:
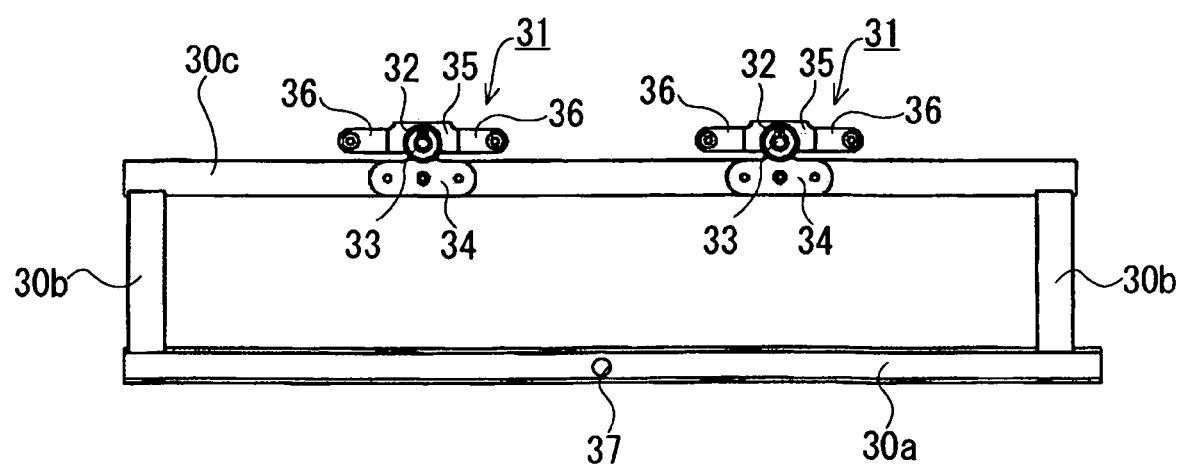
FIG. 7 is a plan view of the force propagation body and pressing parts.

As shown in FIG. 6 and FIG. 7, the force propagation body 3 includes a rectangular frame body including a coupling part 30a passing through the space inside the gripped part 61 of the handle 6 and being coupled to the handle 6, a pair of side parts 30b, 30b perpendicularly extending from both ends of the coupling part 30a, and a base part 30c coupling respective ends of the side parts 30b, 30b together and extending parallel with the coupling part 30a.

The pair of pressing parts 31, 31 projecting toward the force detection parts 2 are respectively attached to the base part 30c of the force propagation body 3 in positions symmetrical about a center line of the force propagation body 3 orthogonal to the base part 30c. A through hole 37 into which the coupling axis 60 described below is to be fitted is provided in the middle of the coupling part 30a.

Pressing Part

Figure 10:
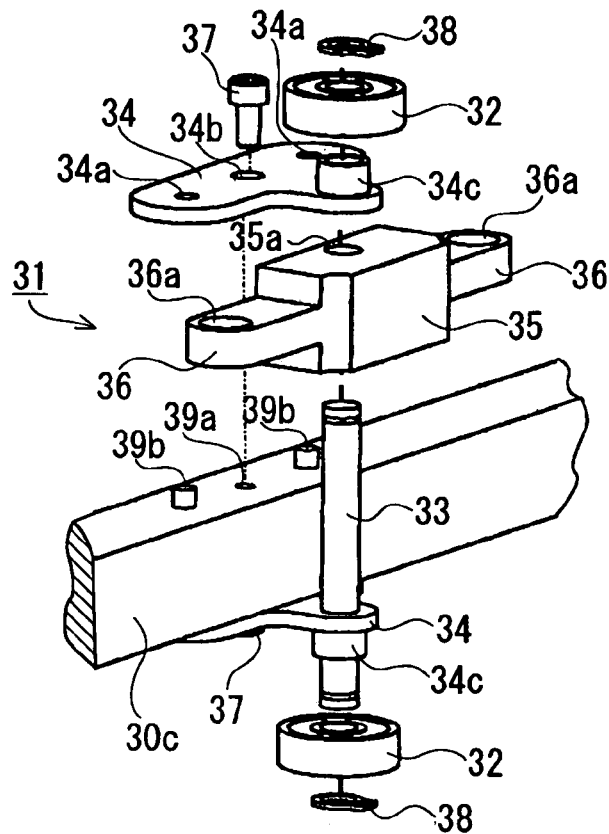
FIG. 10 is an exploded perspective view showing a configuration of a pressing part.

As shown in FIG. 10, each pressing part 31 includes a pair of approximately T-shaped attachment plates 34, 34, a columnar pivot 33 supported by both attachment plates 34, 34, a pair of rollers 32, 32 fixed to both ends of the pivot 33, and a press-contact part 35 to be press-contacted by the force sensor 21 of the force detection part 2. The pivot 33 penetrates the press-contact part 35.

Each attachment plate 34 is provided with a pair of fitting holes 34a, 34a into which a pair of columnar positioning pins 39b, 39b protruded on an upper surface and a lower surface of the base part 30c of the force propagation body 3 are respectively fitted, and a small hole 34b. Each attachment plate 34 is fixed by a screw 37 to the upper surface and lower surface of the base part 30c of the force propagation body 3 through the small hole 34b and a screw hole 39a provided in the upper surface and lower surface of the base part 30c of the force propagation body 3. Bearings 34c are respectively protruded upwardly and downwardly from projecting portions of respective attachment plates 34 projecting toward the force detection part 2. The pivot 33 passes through the inside of each bearing 34c. The rollers 32, 32 are fitted into the bearings 34c of both attachment plates 34, 34, and washers 38, 38 are respectively attached to both ends of the pivot 33 to thereby retain the rollers 32, 32.

The press-contact part 35 is provided between the pair of attachment plates 34, 34. A through hole 35a is provided in a rectangular parallelepiped-like central portion of the press-contact part 35. The pivot 33 passes through the through hole 35a. This enables the press-contact part 35 to rotate on the pivot 33. A pair of spring hook pieces 36, 36 are outwardly protruded from both sides of the press-contact part 35. A spring hook hole 36a is provided at an end of each spring hook piece 36. One end of the coil spring 19 is to be locked into the spring hook hole 36a.

Force Propagation Body Support Part

Figure 11:
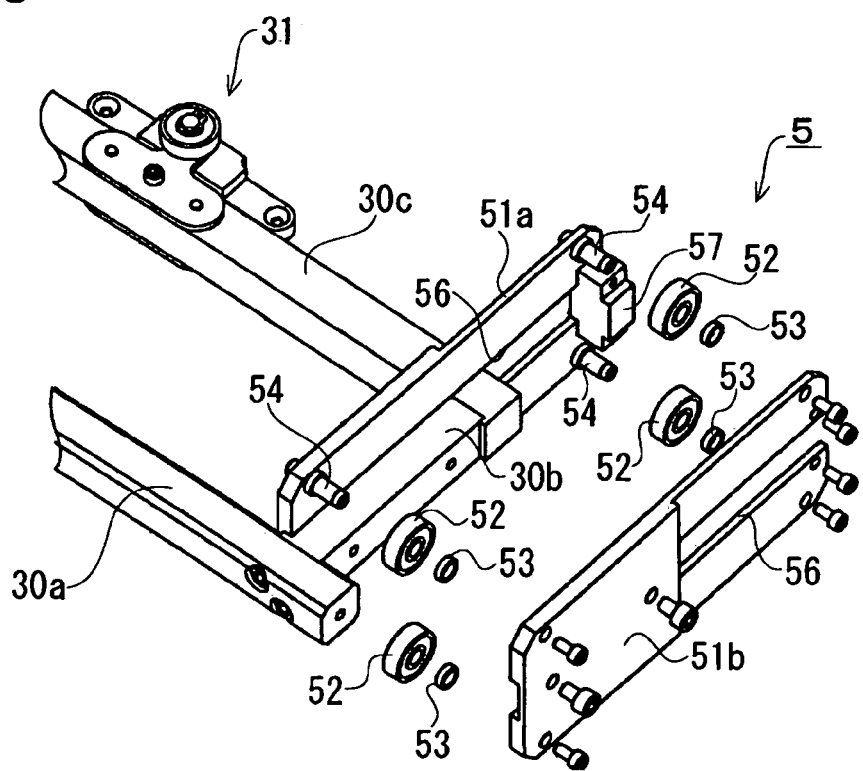
FIG. 11 is an exploded perspective view showing a configuration of a force propagation body support part.

As shown in FIG. 11, the force propagation body support part 5 is attached to the side part 30b of the force propagation body 3 by screwing together a pair of U-shaped side plates 51a, 51b with the side part 30b of the force propagation body 3 and a coupling member 57 sandwiched between both side plates 51a, 51b. Both side plates 51a, 51b are formed with respective cuts 56. The inner side plate 51a is fixed to the side part 30b of the force propagation body 3 with the base part 30c of the force propagation body 3 held in the cut 56.

Columnar shafts 54 are protruded toward the outer side plate 51b from four corners of the opposed face of the inner side plate 51a to the outer side plate 51b. A roller 52 and a spacer 53 are fitted to each shaft 54 to thereby enable each roller 52 to rotate on the shaft 54.

Rollers 52, 52 fitted to a pair of shafts 54, 54 positioned upper than the side part 30b of the force propagation body 3 roll on the reverse surface of the top plate 41 shown in FIG. 2, while rollers 52, 52 fitted to a lower positioned pair of shafts 54, 54 roll on the front surface of the base plate 42 shown in FIG. 2. This enables the force propagation body 3 to be displaced parallel along the reverse surface of the top plate 41 and the front surface of the base plate 42 shown in FIG. 2 while restricted from displacement in the third axis direction between the reverse surface of the top plate 41 and the front surface of the base plate 42.

Coupling Structure of Handle and Force Propagation Body

Figure 8:
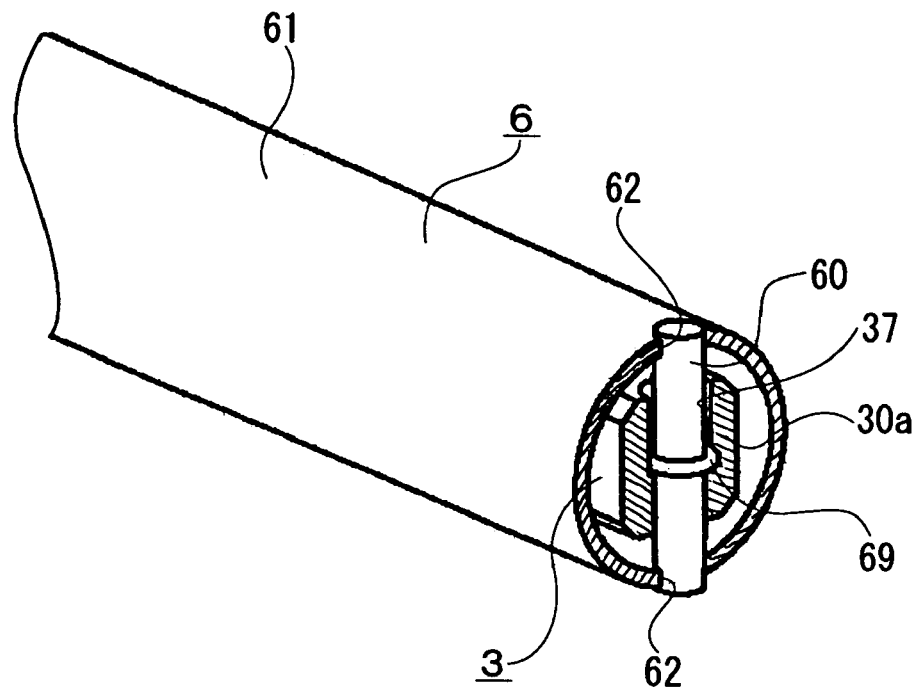
FIG. 8 is a sectional view showing a coupling structure of the handle and force propagation body.

As shown in FIG. 8, the force propagation body 3 is coupled so as to be capable of relative rotation to the handle 6 about the third axis by the columnar coupling axis 60 passing through the small holes 62, 62 provided in the middle of the gripped part 61 of the handle 6 and the through hole 37 provided in the middle of the coupling part 30a of the force propagation body 3. An O-ring 69 is fitted in the gap between the coupling axis 60 and the inner peripheral surface of the through hole 37.

Figure 17:
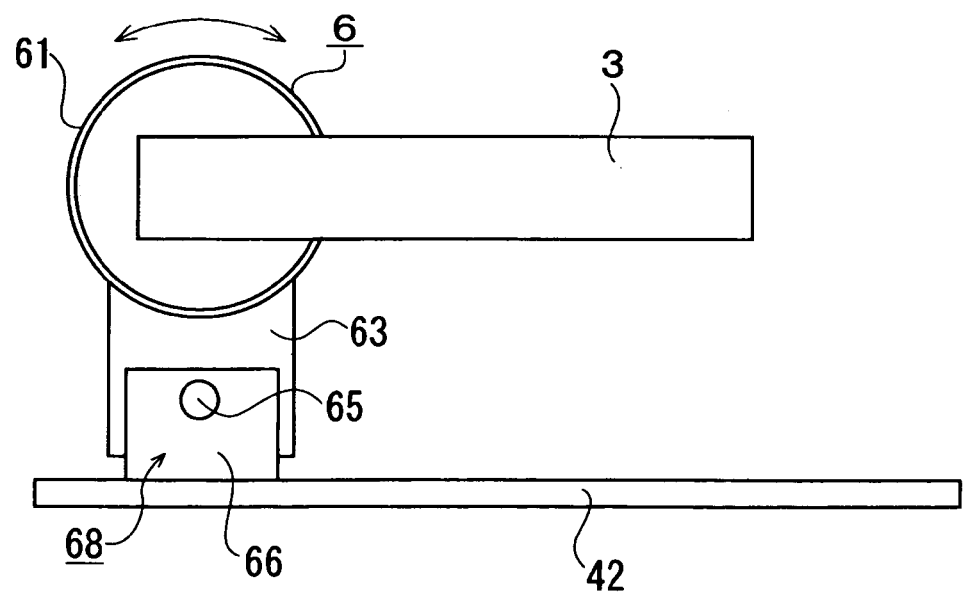
FIG. 17 illustrates relative displacement of the handle to the support in the first axis direction.
Figure 18:
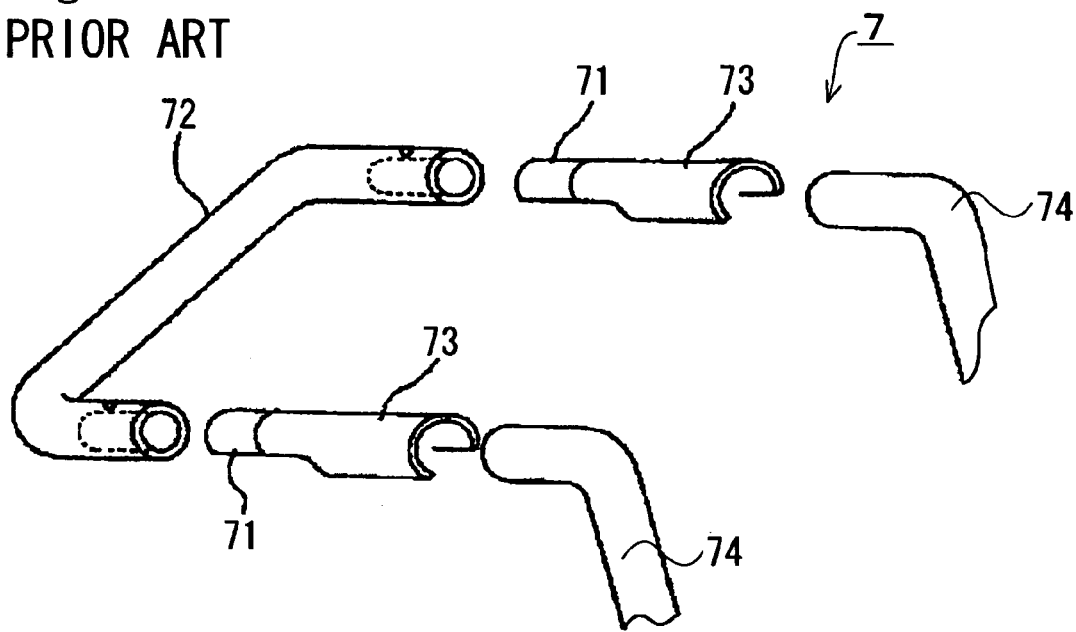
FIG. 18 is an exploded perspective view showing a configuration of a conventional handle.
Figure 19A:
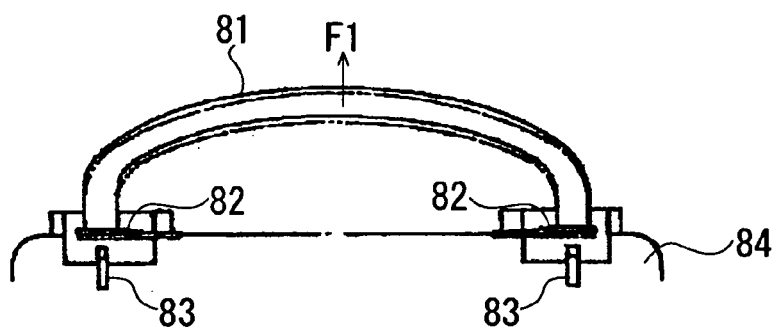
FIG. 19(a) and FIG. 19(b) are plan views showing a conventional force detection device.
Figure 19B:
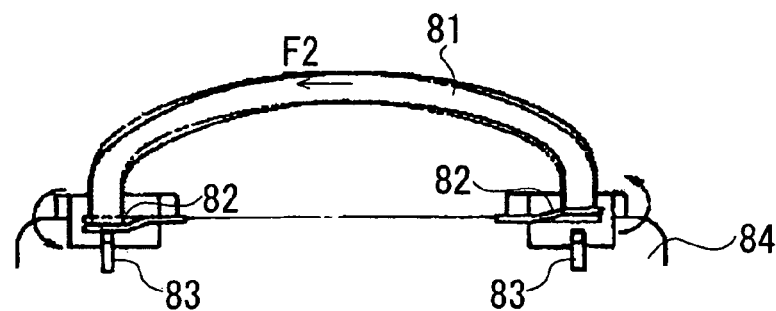

When a force in the first axis direction is applied to the handle 6, the handle 6 swings on the shaft 65 of the support stand 68 as shown in FIG. 17, so that the handle 6 will be slightly relatively displaced to the support 4 not only in the first axis direction but also in the third axis direction. On the other hand, the force propagation body 3 is restricted by both force propagation body support-parts 5, 5 so as to be incapable of relative displacement to the support 4 in the third axis direction, and therefore an oblique force could act on the coupling axis 60 shown in FIG. 8. However, a component of the oblique force in a direction orthogonal to the coupling axis 60 is absorbed due to elastic deformation of the O-ring 69. A component in a direction along the coupling axis 60 is also absorbed due to slide of the O-ring 69 along the coupling axis 60. Therefore, the oblique force will not act on the coupling axis 60.

Force Detection Part

Figure 12:
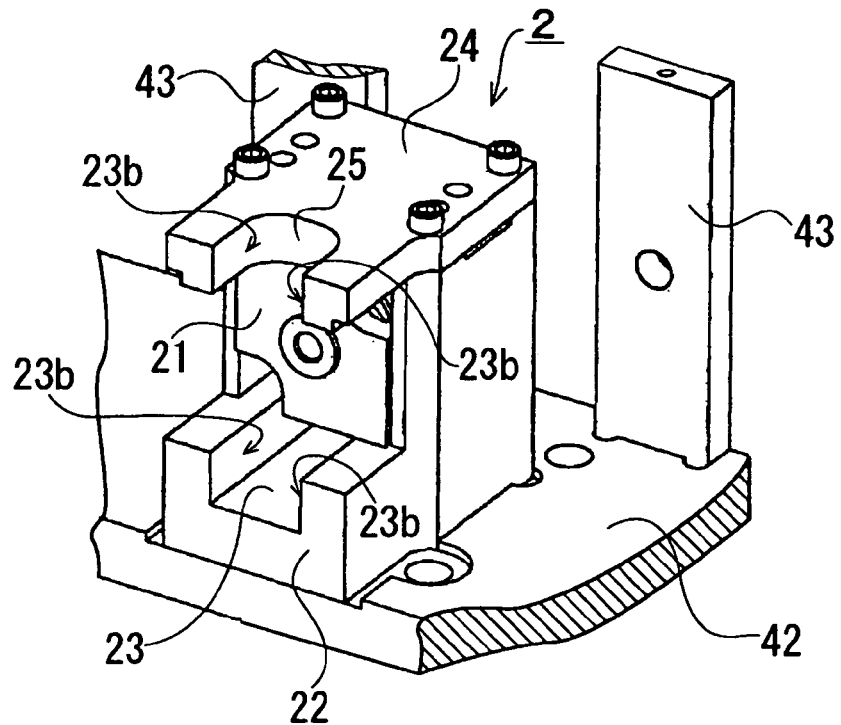
FIG. 12 is a perspective view showing an appearance of a detection part.

As shown in FIG. 12, the force detection part 2 includes the force sensor 21 capable of detecting only a force in the first axis direction and contained inside the space defined by screwing the upper plate 24 on the upper surface of the approximately L-shaped rail member 22 erected on the base plate 42. The force sensor 21 may include, for example, a load cell or super magnetostrictive or pressure-sensitive rubber pressure sensor or the like.

As shown in FIG. 2 and FIG. 3, the pair of force detection parts 2, 2 are provided side by side on the surface of the base plate 42 so as to be symmetrical about the center line of the force propagation body 3 extending in the first axis direction.

A guide groove 23 along the first axis direction is recessed in the rail member 22 shown in FIG. 12 from the opposed portion of the pressing part 31 toward the force sensor 21 disposed in the back. Engaged with the guide groove 23 is the lower roller 32 of the pair of rollers 32, 32 disposed above and below in the pressing part 31 shown in FIG. 10. A semielliptical cut 25 is recessed in the upper plate 24 shown in FIG. 12 from the opposed portion of the pressing part 31. The upper roller 32 of the pressing part 31 shown in FIG. 10 is to be engaged with the cut 25.

A pair of guide surfaces 23b, 23b for guiding the displacement of the pressing part 31 in the first axis direction while restricting the displacement in the second axis direction are defined in the guide groove 23 and cut 25 shown in FIG. 12, facing each other in the second axis direction.

The pair of guide surfaces 23b, 23b are defined with a certain slight allowance relative to a diameter of the roller 32. This allows relative displacement of each pressing part 31 to the force detection part 2 in the first axis direction and relative rotation about the third axis within the certain allowance, and restricts relative displacement in the second axis direction, with the pair of rollers 32, 32 of the pressing part 31 respectively engaged with the guide groove 23 and the cut 25.

A pair of spring hook plates 43, 43 are erected on the base plate 42 at both sides in the back of the force detection part 2 with the force detection part 2 provided therebetween. One end of the coil spring 19 is to be locked to each spring hook plate 43.

Coupling Structure of Force Detection Part and Pressing Part

Figure 13:
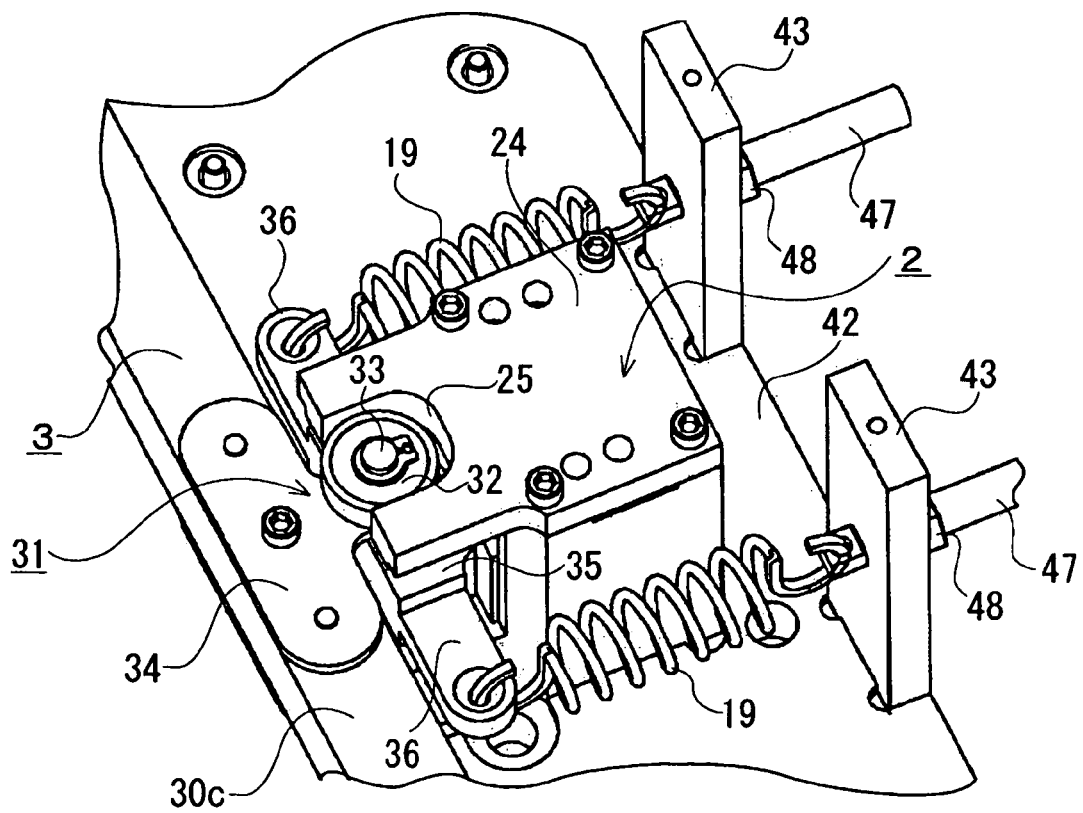
FIG. 13 is a perspective view showing a coupling structure of the pressing part and force detection part.

As shown in FIG. 13, a columnar spring post 47 extending along the first axis direction is inserted into each spring hook plate 43. The coil spring 19 is stretched between one end of the spring post 47 and one end of the spring hook piece 36 of the press-contact part 35 of the pressing part 31 shown in FIG. 10. The press-contact part 35 of the pressing part 31 shown in FIG. 10 is forced on the force sensor 21 of the force detection part 2 shown in FIG. 12 in the first axis direction due to elastic repulsive forces of the pair of coil springs 19, 19 to thereby give the force sensor 21 a certain preload. Therefore, when the handle 6 is not given an external force, the force sensor 21 will detect the certain preload. When the handle 6 is given an external force, the force sensor 21 will detect a resultant of the preload and the external force.

A projecting amount of the spring post 47 projecting from the spring hook plate 43 toward the force detection part 2 can be adjusted by a preload adjustment nut 48 provided on the rear side of the spring hook plate 43. This allows adjustment of a magnitude and balance of the preload applied to the force sensor 21 by the pair of coil springs 19, 19.

The press-contact part 35 freely rotates on the pivot 33 so as to equalize the elastic repulsive forces of both coil springs 19, 19. The pressing part 31 is thereby always biased in the first axis direction due to the elastic repulsive forces of both coil springs 19, 19, and therefore realizes smooth reciprocation of both pressing parts 31, 31 along the first axis direction.

Figure 14A:
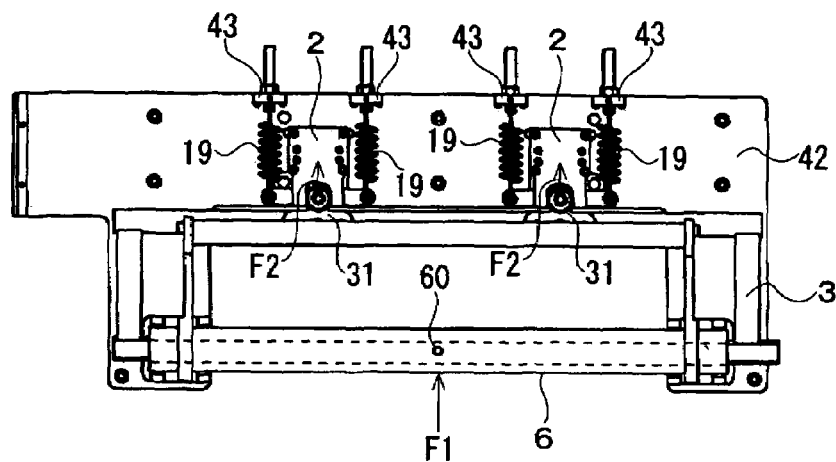
FIG. 14(a) and FIG. 14(b) illustrate a principle of detecting a force in a first axis direction applied to the handle.
Figure 14B:
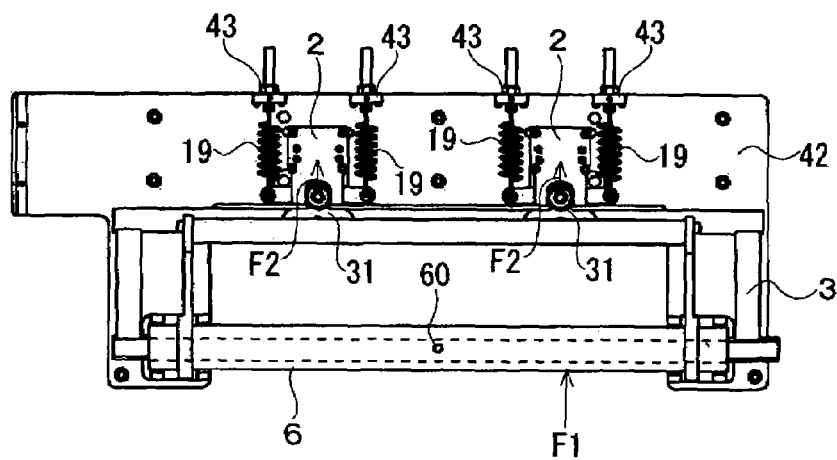

As shown in FIG. 14(*a*), when a force F1 in the first axis direction is applied to the middle of the handle 6, the handle 6 swings on the shaft 65 of the support stand 68 in the first axis direction as shown in FIG. 17. The force applied to the handle 6 acts on the force propagation body 3 via the coupling axis 60. The pressing part 31 of the force propagation body 3 is thereby guided by the pair of guide surfaces 23b, 23b of the force detection part 2 shown in FIG. 12 to press the force sensor 21 in the first axis direction. Both force sensors 21, 21 are thereby respectively given a force F2 corresponding to the half of the force F1 applied to the handle 6. Consequently, each force sensor 21 will detect a resultant of the force F2 and the preload.

An actual force applied to each sensor 21 by operation of the handle 6 can be found by a difference between a detected value of each force sensor 21 and the preload, based on which rotation speeds and rotation directions of both motors 13, 13 shown in FIG. 1 are controlled. In the above case, the forces applied to both force sensors 21, 21 are equal, based on which both motors 13, 13 are driven at equal rotation speeds in the same direction to thereby give the truck 10 a forward drive force.

On the other hand, as shown in FIG. 14(*b*), when a force F1 in the first axis direction is applied biasedly toward right from the middle of the handle 6, the handle 6 swings on the shaft 65 of the support stand 68 in the first axis direction as shown in FIG. 17 without a rotational force occurring at the handle 6 because the handle 6 is restricted so as to be unrotatable about the third axis.

A force applied to the handle 6 by an operator is transmitted to the force propagation body 3 via the coupling axis 60, and therefore the force applied to the handle 6 always acts on a constant position of the force propagation body 3, i.e. penetrating position of the coupling axis 60, independently of the position where the operator has applied the force to the handle 6. Therefore, the force F1 in the first axis direction acts on the penetrating position of the coupling axis 60 on the force propagation body 3 as in the case where the force is applied to the middle of the handle 6.

Consequently, the pressing part 31 of the force propagation body 3 presses the force sensor 21 in the first axis direction, and both force sensors 21, 21 are given a force corresponding to the half of the force F1 applied to the handle 6, so that each force sensor 21 will detect a resultant of the force F2 and the preload. Both motors 13, 13 are then driven at equal rotation speeds in the same direction based on a difference between a detected value of each force sensor 21 and the preload, and consequently, the truck 10 is given a forward drive force.

Figure 15A:
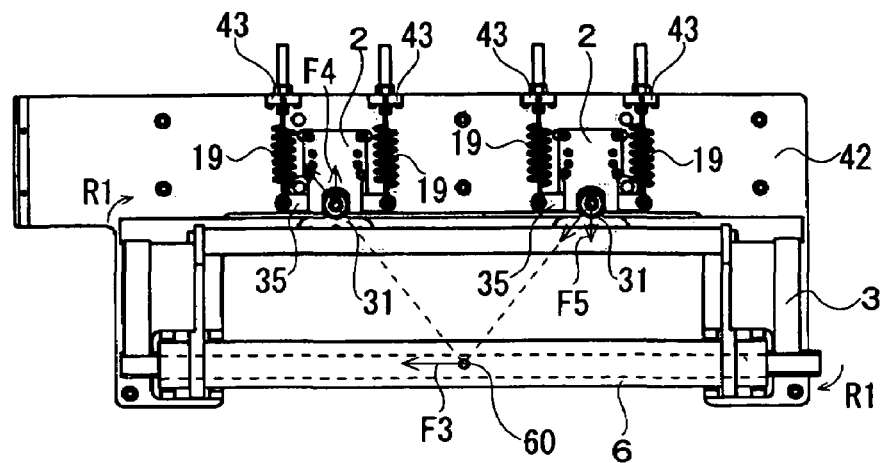
FIG. 15(a) and FIG. 15(b) illustrate a principle of detecting a force in a second axis direction applied to the handle.
Figure 15B:
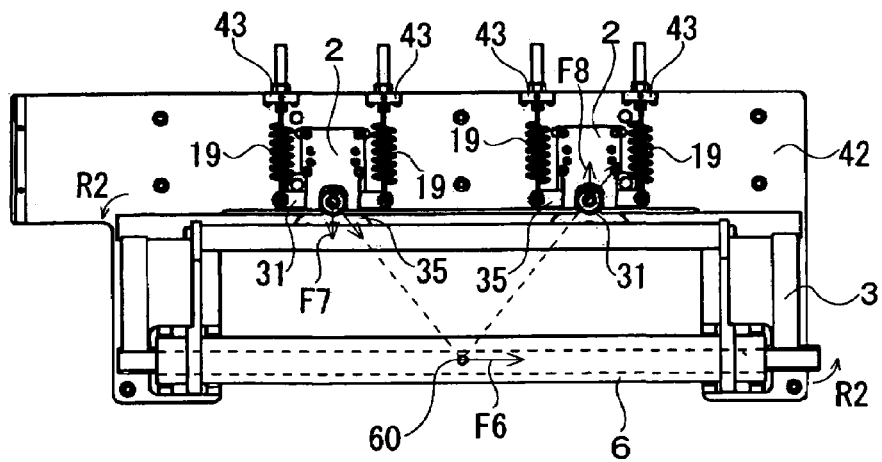
Figure 16:
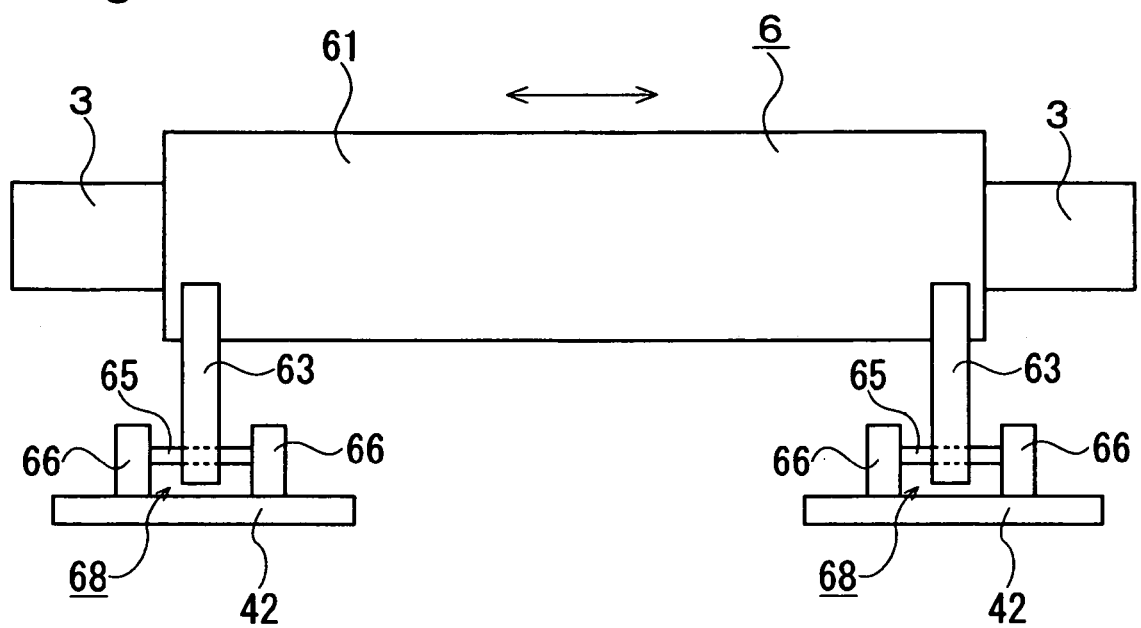
FIG. 16 illustrates relative displacement of the handle to a support in the second axis direction.

As shown in FIG. 15(*a*), when a leftward force F3 along the second axis direction is applied to the handle 6, the handle 6 is displaced leftward along the shaft 65 of the support stand 68 as shown in FIG. 16. This causes the leftward force F3 to act on the force propagation body 3 via the coupling axis. However, each pressing part 31 is restricted from relative displacement to the force detection part 2 in the second axis direction by the pair of guide surfaces 23b, 23b of the force detection part 2 shown in FIG. 12. Therefore, a clockwise rotational force R1 on the coupling axis 60 about the third axis occurs at the force propagation body 3.

Here, outer peripheral surfaces of the rollers 32 of the pressing part 31 shown in FIG. 10 are forced on right guide surfaces 23b of pairs of guide surfaces 23b, 23b of the guide groove 23 and the cut 25 shown in FIG. 12. A component in the second axis direction of a force that occurs at each pressing part 31 is received by the guide surfaces 23b.

The left pressing part 31 of the pair of pressing parts 31, 31 receives a component F4 along the first axis direction, and is displaced closer to the force sensor 21. On the other hand, the right pressing part 31 receives a component F5 along the first axis direction, and is displaced farther from the force sensor 21 against the preload.

Consequently, the left force sensor 21 will detect a resultant of the force in a direction of compressing both coil springs 19, 19 (hereinafter referred to as a compression force) F4 and the preload, while the right force sensor 21 will detect a resultant of the force in a direction of expanding both coil springs 19, 19 (hereinafter referred to as an expansion force) F5 and the preload.

An actual force applied to each force sensor 21 by operation of the handle 6 is then found by a difference between a detected value of each force sensor 21 and the preload, based on which rotation speeds and rotation directions of both motors 13, 13 shown in FIG. 1 are controlled. In the above case, by the difference between the detected value of each force sensor 21 and the preload, it is detected that a force in the positive direction and a force in the negative direction are applied to the left force sensor 21 and the right force sensor 21, respectively. Based on this, both motors 13, 13 are driven such that a rotation speed of the left motor 13 shown in FIG. 1 is greater than a rotation speed of the right motor 13, or the left motor 13 is driven in normal rotation with the right motor 13 in reverse rotation. This gives the truck 10 a clockwise turning drive force.

On the other hand, as shown in FIG. 15(b), when a rightward force F6 along the second axis direction is applied to the handle 6, the handle 6 is displaced rightward along the shaft 65 of the support stand 68 as shown in FIG. 16. This causes a counterclockwise rotational force R2 on the coupling axis 60 about the third axis at the force propagation body 3. Consequently, a compression force F8 and an expansion force F7 will act on the right force sensor 21 and the left force sensor 21, respectively.

Then, by a difference between a detected value of each force sensor 21 and the preload, it is detected that a force in the positive direction and a force in the negative direction are applied to the right force sensor 21 and the left force sensor 21, respectively. Based on this, both motors 13, 13 are driven such that a rotation speed of the right motor 13 shown in FIG. 1 is greater than a rotation speed of the left motor 13, or the right motor 13 is driven in normal rotation with the left motor 13 in reverse rotation. This gives the truck 10 a counterclockwise turning drive force.

Therefore, according to the force detection device 1 of the present invention, a direction of a force applied to the handle 6 can be accurately detected regardless of a gripped position of the handle 6.

The present invention is not limited to the foregoing embodiment but can be modified variously by one skilled in the art without departing from the spirit of the invention as set forth in the appended claims. For example, while the O-ring 69 is fitted to the coupling axis 60 in the present embodiment as shown in FIG. 8 in order to absorb an oblique force acting on the coupling axis 60, a metal ring with a diameter slightly larger than that of the coupling axis 60 may be used instead of the O-ring 69. In this case, the oblique force will be absorbed by the metal ring sliding along the coupling axis 60.

What is claimed is:

1. A force detection device for detecting an operation force applied by an operator in a forward/backward direction and/or lateral direction of an object, the force detection device comprising:

a handle to be gripped and given the operation force by the operator, disposed on a support reciprocatably along a first axis direction along the forward/backward direction and a second axis direction orthogonal thereto, and unrotatably about a third axis direction orthogonal to the first axis and second axis; a pair of force detection parts capable of detecting only a force in the first axis direction and disposed on the support in a spaced-apart relationship in the second axis direction; and a force propagation body for transmitting an external force applied to the handle to both force detection parts, which intervenes between both force detection parts and the handle, the force propagation body comprising a pair of pressing parts for pressing the pair of force detection parts, protruded toward the force detection parts, wherein the pressing parts are restricted from relative displacement to the support in the second axis direction by their engagement with the respective force detection parts, and the force propagation body is coupled to the handle so as to be capable of relative rotation to the handle about the third axis.

2. The force detection device according to claim 1, wherein the handle comprises a cylindrical gripped part to be gripped by the operator, extending along the second axis direction, and the force propagation body comprises a coupling part passing through the space inside the gripped part, the force propagation body and the handle being coupled by a coupling axis penetrating in the third axis direction the gripped part of the handle and the coupling part of the force propagation body in the middle thereof in the second axis direction such that the force propagation body is capable of relative rotation to the handle on the coupling axis.

3. The force detection device according to claim 2, wherein the gripped part of the handle comprises two small holes for passing the coupling axis therethrough, while the coupling part of the force propagation body comprises a through hole for passing the coupling axis therethrough, and an O-ring is fitted in the gap between the coupling axis and the inner peripheral surface of the through hole.

4. The force detection device according to claim 1, wherein the handle comprises a rectangular frame body comprising the cylindrical gripped part, a pair of side plates expanding perpendicularly to the gripped part from both ends of the gripped part, and a coupling part extending parallel with the gripped part to couple together ends of both side plates in the first axis direction.

5. The force detection device according to claim 4, wherein the support comprises a flat plate-like top plate and base plate oppositely disposed in the third axis direction and coupled to each other, and the handle is supported by a pair of support stands fixed to a surface of the base plate, each support stand comprising a pair of support blocks disposed at both sides of a side plate of the handle with the side plate sandwiched therebetween, and a shaft extending in the second axis direction to couple both support blocks together, the shaft penetrating the side plate, the handle being supported with the shaft so as to be capable of relative displacement to the support in the second axis direction along the shaft and of swinging on the shaft relative to the support in the first axis direction.

6. The force detection device according to claim 1, wherein the handle comprises the cylindrical gripped part and a pair of side plates expanding perpendicularly to the gripped part from both ends of the gripped part, and is supported by a pair of support stands fixed to the support, each support stand comprising a support block disposed parallel to a side plate of the handle and a shaft extending in the second axis direction, the shaft penetrating the side plate, the handle being supported with the shaft so as to be capable of relative displacement to the support in the second axis direction along the shaft and of swinging on the shaft relative to the support in the first axis direction.

7. The force detection device according to claim 6, wherein the handle comprises a coupling part for coupling together ends of the both side plates in the first axis direction, and forms a rectangular frame body comprising the both side plate and the gripped part.

8. A movable body comprising a force detection device for detecting an operation force applied by an operator in a forward/backward direction and/or clockwise/counterclockwise turning direction of an object, and a motive power source to be controlled in accordance with a detection result of the force detection device, the force detection device comprising a handle to be gripped and given the operation force by the operator; a support for supporting the handle, the handle being disposed on the support reciprocatably along a first axis direction along the forward/backward direction and a second axis direction orthogonal thereto, and unrotatably about a third axis direction orthogonal to the first axis and second axis; a pair of force detection parts capable of detecting only a force in the first axis direction and disposed on the support in a spaced-apart relationship in the second axis direction; and a force propagation body for transmitting an external force applied to the handle to both force detection parts, which intervenes between both force detection parts and the handle, the force propagation body comprising a pair of pressing parts for pressing the pair of force detection parts, protruded toward the force detection parts, wherein the pressing parts are restricted from relative displacement to the support in the second axis direction by their engagement with the respective force detection parts, and the force propagation body is coupled to the handle so as to be capable of relative rotation to the handle about the third axis.

* * * * *